(12) United States Patent
Wu et al.

(10) Patent No.: US 10,823,443 B2
(45) Date of Patent: Nov. 3, 2020

(54) SELF-ADAPTIVE SMART SETBACK CONTROL SYSTEM

(71) Applicant: Carrier Corporation, Palm Beach Gardens, FL (US)

(72) Inventors: Xinyu Wu, Shanghai (CN); Sheng Li, Shanghai (CN); Xing Cai, Shanghai (CN); Jun Pyo Lee, Zionsville, IN (US); Marcin Cychowski, Cork (IE)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/039,416

(22) Filed: Jul. 19, 2018

(65) Prior Publication Data
US 2019/0024925 A1     Jan. 24, 2019

Related U.S. Application Data (60) Provisional application No. 62/535,022, filed on Jul. 20, 2017.

(51) Int. Cl.
*G05B 19/042* (2006.01)
*F24F 11/46* (2018.01)
(Continued)

(52) U.S. Cl.
CPC .............. *F24F 11/46* (2018.01); *F24F 11/64* (2018.01); *F24F 11/65* (2018.01); *G05B 19/042* (2013.01);
(Continued)

(58) Field of Classification Search
CPC ......... G05B 19/042; F24F 11/46; F24F 11/64; F24F 11/65; F24F 11/56; F24F 11/58
See application file for complete search history.

(56) References Cited

U.S. PATENT DOCUMENTS 4,702,413 A    10/1987    Beckey et al.
4,817,705 A    4/1989    Levine et al.
(Continued)

FOREIGN PATENT DOCUMENTS

CA    2141204 C    8/2001
EP    2769277 B1    8/2014

OTHER PUBLICATIONS

The Smart Thermostat Using Occupancy Sensors to Save Energy in Homes; Distributed Systems Seminar 2011; Speaker: Daniel Pauli Tutor: Benedikt Ostermaier (35 pages).

*Primary Examiner* — Mark A Connolly
(74) *Attorney, Agent, or Firm* — Cantor Colburn LLP (57) ABSTRACT

A self-adaptive smart setback heating, ventilation and air conditioning (HVAC) control system includes an HVAC unit configured to deliver at least one of heated air and cooled air to a target area. A temperature sensor determines a current internal air temperature (IAT) of the target area. An HVAC controller is in signal communication with the HVAC unit and the temperature sensor. The HVAC controller selectively operates in an active mode and a setback mode. The active mode controls the HVAC unit based on a first temperature setpoint value, and the setback mode controls the HVAC unit based on a second temperature setpoint value different from the first temperature setpoint value. The HVAC controller includes an electronic temperature setback unit that is configured change the IAT during the setback mode based on an actively determined upcoming temperature recovery rate.

16 Claims, 6 Drawing Sheets

(51) Int. Cl.
  *F24F 11/64* (2018.01)
  *F24F 11/65* (2018.01)
  *F24F 11/56* (2018.01)
  *F24F 120/12* (2018.01)
  *F24F 110/10* (2018.01)
  *F24F 110/12* (2018.01)
  *F24F 11/58* (2018.01)

(52) U.S. Cl.
  CPC ............... *F24F 11/56* (2018.01); *F24F 11/58* (2018.01); *F24F 2110/10* (2018.01); *F24F 2110/12* (2018.01); *F24F 2120/12* (2018.01); *G05B 2219/2614* (2013.01)

(56) References Cited

U.S. PATENT DOCUMENTS

| | | |
|---|---|---|
| 5,025,984 A | 6/1991 | Bird et al. |
| 5,056,712 A | 10/1991 | Enck |
| 5,270,952 A | 12/1993 | Adams et al. |
| 5,555,927 A | 9/1996 | Shah |
| 5,822,997 A | 10/1998 | Atterbury |
| 5,934,369 A | 8/1999 | Dosani et al. |
| 7,099,748 B2 | 8/2006 | Rayburn |
| 7,809,472 B1 | 10/2010 | Silva et al. |
| 7,848,900 B2 | 12/2010 | Steinberg et al. |
| 8,010,237 B2 | 8/2011 | Cheung et al. |
| 8,141,791 B2 | 3/2012 | Rosen |
| 8,204,628 B2 | 6/2012 | Schnell et al. |
| 8,560,127 B2 | 10/2013 | Leen et al. |
| 8,560,128 B2 | 10/2013 | Ruff et al. |
| 8,862,280 B1 | 10/2014 | Dyess et al. |
| 8,950,687 B2 | 2/2015 | Bergman et al. |
| 9,298,196 B2 | 3/2016 | Matsuoka et al. |
| 9,377,212 B2 | 6/2016 | Wallaert |
| 9,459,018 B2 | 10/2016 | Fadell et al. |
| 9,501,071 B2 | 11/2016 | Shah |
| 9,595,070 B2 | 3/2017 | Matsuoka et al. |
| 10,012,404 B2 | 7/2018 | Munier et al. |
| 2001/0019037 A1 | 9/2001 | Zakhidov et al. |
| 2007/0228183 A1 | 10/2007 | Kennedy et al. |
| 2012/0165993 A1 | 6/2012 | Whitehouse |
| 2014/0303789 A1* | 10/2014 | Wroblewski ............. F24F 11/30 700/276 |
| 2015/0019037 A1 | 1/2015 | Koch |
| 2015/0066220 A1 | 3/2015 | Sloo et al. |
| 2015/0316282 A1 | 11/2015 | Stone et al. |
| 2015/0370272 A1 | 12/2015 | Reddy et al. |
| 2016/0169547 A1 | 6/2016 | Matsuoka et al. |
| 2017/0108231 A1* | 4/2017 | Hasegawa ................ F24F 7/08 |

* cited by examiner

SELF-ADAPTIVE SMART SETBACK CONTROL SYSTEM

CROSS-REFERENCE TO RELATED APPLICATIONS

This application claims the benefit of U.S. Provisional Application No. 62/535,022 filed Jul. 20, 2017, which is incorporated herein by reference in its entirety.

BACKGROUND

Various non-limiting embodiments of the disclosure pertain to the art of heating, venting, and air conditioning (HVAC) systems, and more particular, to HVAC control systems.

Conventional HVAC systems are typically operated by manipulating a thermostat to select a desired temperature set point that corresponds to given living area or occupancy zone. The efficiency of the HVAC system can be improved using digital thermostats that allow a user to schedule operating times and/or temperatures of the HVAC system at different times of the day. Accordingly, the HVAC system can be automatically switched off or set to less desirable temperatures at times of the day when rooms are not occupied, and automatically switched on to operate at a more desirable temperature during times when rooms are expected to be occupied.

BRIEF DESCRIPTION

According to a non-limiting embodiment, a self-adaptive smart setback heating, ventilation and air conditioning (HVAC) control system includes an HVAC unit configured to deliver at least one of heated air and cooled air to a target area. A temperature sensor determines a current internal air temperature (IAT) of the target area. An HVAC controller is in signal communication with the HVAC unit and the temperature sensor. The HVAC controller selectively operates in an active mode and a setback mode. The active mode controls the HVAC unit based on a first temperature setpoint value, and the setback mode controls the HVAC unit based on a second temperature setpoint value different from the first temperature setpoint value. The HVAC controller includes an electronic temperature setback unit that is configured change the IAT during the setback mode based on an actively determined upcoming temperature recovery rate.

The system further includes a feature, wherein the temperature setback unit is configured to determine a post-setback comfort temperature (PCT) setpoint that is different from the second temperature setpoint value. The temperature setback unit actively determines a recovery start time while operating in the setback mode. The recovery start time initiates the HVAC unit to generate the cooled air or the heated air such that the IAT of the target area existing during the setback mode is changed to reach the PCT setpoint at the upcoming temperature recovery rate.

The system further includes a feature, wherein the upcoming temperature recovery rate is a rate at which the current temperature is changed over a recovery time period to reach the PCT setpoint.

The system further comprises a database configured to store at least one previously recorded temperature recovery rates corresponding to the target area.

The system further includes a feature, wherein the temperature setback unit actively determines the recovery start time based on the upcoming temperature recovery rate and temperature difference between the current IAT and the PCT setpoint.

The system further includes a feature, wherein the upcoming recovery rate is determined based on a comparison between the previously recorded temperature recovery rates and current conditions of the target area.

The system further includes a feature, wherein the electronic temperature setback unit determines the previously recorded temperature recovery rates based on performing operations of recording a previous temperature recovery rate of the target area in response to changing the IAT during a previous setback mode, actively determines a learned temperature recovery rate of the target area based on a plurality of previously recorded temperature recovery rates, determines the current conditions of the target area, determines an upcoming temperature recovery rate of the target corresponding to an upcoming scheduled setback mode based on the learned temperature recovery rate and the current conditions, and determines the recovery start time based on the upcoming temperature recovery rate and the current conditions.

The system further includes a feature, wherein the electronic temperature setback unit compares a current time while operating in the setback mode to the recovery start time, and initiates the HVAC unit to generate the cooled air or the heated air when the current time is equal to or later than the recovery start time.

The system further includes a feature, wherein the electronic temperature setback unit discontinues the setback mode in response to the current IAT reaching the PCT setpoint following the recovery start time.

According to another non-limiting embodiment, a method of controlling a self-adaptive smart setback heating, ventilation and air conditioning (HVAC) control system comprises delivering at least one of heated air and cooled air to a target area, and determining a current internal air temperature (IAT) of the target area. The method further comprises selectively operating an HVAC controller in an active mode and a setback mode. The active mode controls the HVAC unit based on a first temperature setpoint value, and the setback mode controls the HVAC unit based on a second temperature setpoint value different from the first temperature setpoint value. The method further comprises changing the IAT during the setback mode based on an actively determined upcoming temperature recovery rate.

The method further determines a post-setback comfort temperature (PCT) setpoint that is different from the second temperature setpoint value, and actively determines a recovery start time while operating in the setback mode. The recovery start time initiates the HVAC unit to generate the cooled air or the heated air, to change the IAT of the target area existing during the setback mode to reach the PCT setpoint at the upcoming temperature recovery rate.

The method further includes a feature wherein the upcoming temperature recovery rate is a rate at which the current temperature is changed over a recovery time period to reach the PCT setpoint.

The method further includes a feature of storing at least one previously recorded temperature recovery rates corresponding to the target area.

The method further includes a feature of actively determining the recovery start time based on the upcoming temperature recovery rate and temperature difference between the current IAT and the PCT setpoint.

The method further includes a feature of comprising determining the upcoming recovery rate based on a comparison between the previously recorded temperature recovery rates and current conditions of the target area.

The method further includes a feature wherein determining the previously recorded temperature recovery rates comprises recording a previous temperature recovery rate of the target area in response to changing the IAT during a previous setback mode, actively determining a learned temperature recovery rate of the target area based on a plurality of previously recorded temperature recovery rates, determining the current conditions of the target area, determining an upcoming temperature recovery rate of the target corresponding to an upcoming scheduled setback mode based on the learned temperature recovery rate and the current conditions, and determining the recovery start time based on the upcoming temperature recovery rate and the current conditions.

The method further includes a feature of comparing a current time while operating in the setback mode to the recovery start time, and initiating the HVAC unit to generate the cooled air or the heated air when the current time is equal to or later than the recovery start time.

The method further includes a feature of discontinuing the setback mode in response to the current IAT reaching the PCT setpoint following the recovery start time.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application. For example, "about" can include a range of ±8% or 5%, or 2% of a given value.

Conventional HVAC control systems typically monitor only the temperature of one or more rooms in a building or house to operate an HVAC unit according to a target temperature set point value set by the user. These conventional HVAC control system also are capable of operating according to an operating schedule that is input to the HVAC controller (e.g., digital thermostat). The operating schedule includes different temperature set-points that correspond to different time periods. For example, when operating in a heating mode, the operating schedule may include a first temperature set point that corresponds to a time when a person is typically located in the house, and a second lower temperature set-point when the person is typically away from the house. Accordingly, the operating schedule provides a means to improve HVAC operating efficiency, conserve energy, and reduce operating costs. The operating schedule also allows for initiating the HVAC system at a specified time before the occupant of a house returns home. In this manner, the occupant can return to the home without the need to wait for the dwelling to reach occupant's desired temperature set point.

However, different occupancies at different houses may set different values for both the first temperature set point (that corresponds to a time when a person is typically located in the house) and the second lower temperature set-point (when the person is typically away from the house). Various building characteristics and exterior environmental conditions can also cause deviations between the desired or target HVAC performance and the actual HVAC performance In addition, daily variations in exterior environmental conditions can cause performance deviations in the HVAC system from one day to the next. Consequently, an HVAC system operating according to only a set operating schedule can perform inefficiently, thereby expending excess energy and increasing operating costs.

Various non-limiting embodiments of the disclosure provide a self-adapting smart setback HVAC control system that actively determines (i.e., learns) an indoor temperature recovery rate based on historical operating data of an HVAC system. Based on the learned indoor temperature recovery rate, the self-adapting HVAC control system actively determines an HVAC unit start-up time. In this manner, the HVAC unit start-up time can be actively varied (i.e., adapted) from day-to-day based on different HVAC performance, different exterior environmental conditions, and different user setting of temperature set point.

Figure 1:
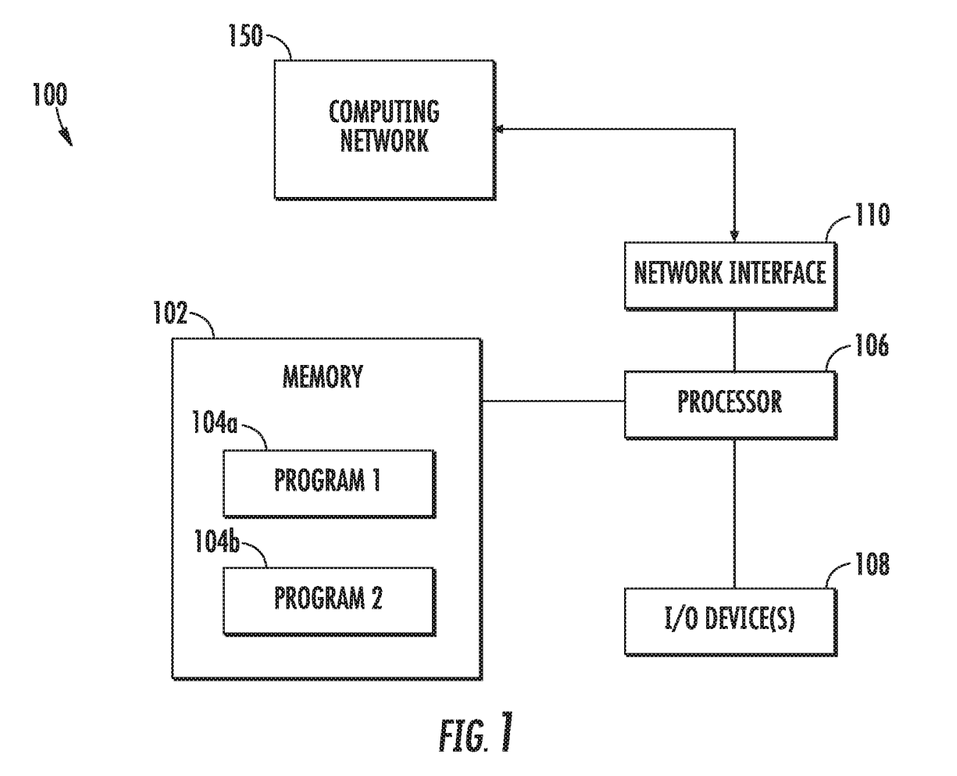
FIG. 1 is a block diagram of a computing system according to a non-limiting embodiment.

With reference now to FIG. 1, a computing system 100 capable of performing one or more embodiments is illustrated. The computing system 100 includes a memory 102 and an electronic hardware processor or controller 106. The memory 102 stores various instructions algorithms which are executable by the controller 106. The memory 102 can also store set HVAC operating schedules, parameters, temperature set points, and historical data obtained from the computing network 150, the controller 106 and/or the I/O devices 108. The executable instructions can be stored or organized in any manner and at any level of abstraction, such as in connection with one or more processes, routines, procedures, methods, functions, etc. As an example, at least a portion of the instructions are shown in FIG. 1 as being associated with a first program 104a and a second program 104b. The programs 104a and 104b can include HVAC control programs and/or scheduling software that capable of automatically controlling an HVAC system.

The controller 106 can be included in a computing system installed in a cloud-based network, a mobile computing device, or a local control system such as, for example, an HVAC control system. The controller 106 electrically communicates with the memory 102 in response to receiving commands from one or more input/output (I/O) devices 108. In some embodiments, the I/O device(s) 108 may include one or more of a keyboard or keypad, a touchscreen or touch panel, a display screen, a microphone, a speaker, a mouse, a button, a remote control, a joystick, a printer, a telephone or mobile device (e.g., a smartphone), etc. The I/O device(s)

108 may be configured to provide an interface such as a thermostat interface, for example, to allow a user to interact with the system 100.

The computing system 100 further includes a network interface 110 capable of electrical communication with a computing network 150. The computing network 150 can be implemented as a local on-site network and/or a cloud computing network. The network interface 110 includes any communication device (e.g., a modem, wireless network adapter, etc.) that operates according to a network protocol (e.g., Wi-Fi, Ethernet, satellite, cable communications, etc.) which establishes a wired and/or wireless communication with the computing network 150.

The computing system 100 is illustrative as an example. In some embodiments, one or more of the entities may be optional. In some embodiments, additional entities not shown may be included. For example, in some embodiments the computing system 100 may be associated with one or more networks, such as one or more computer or telephone networks. In some embodiments, the entities may be arranged or organized in a manner different from what is shown in FIG. 1.

Figure 2:
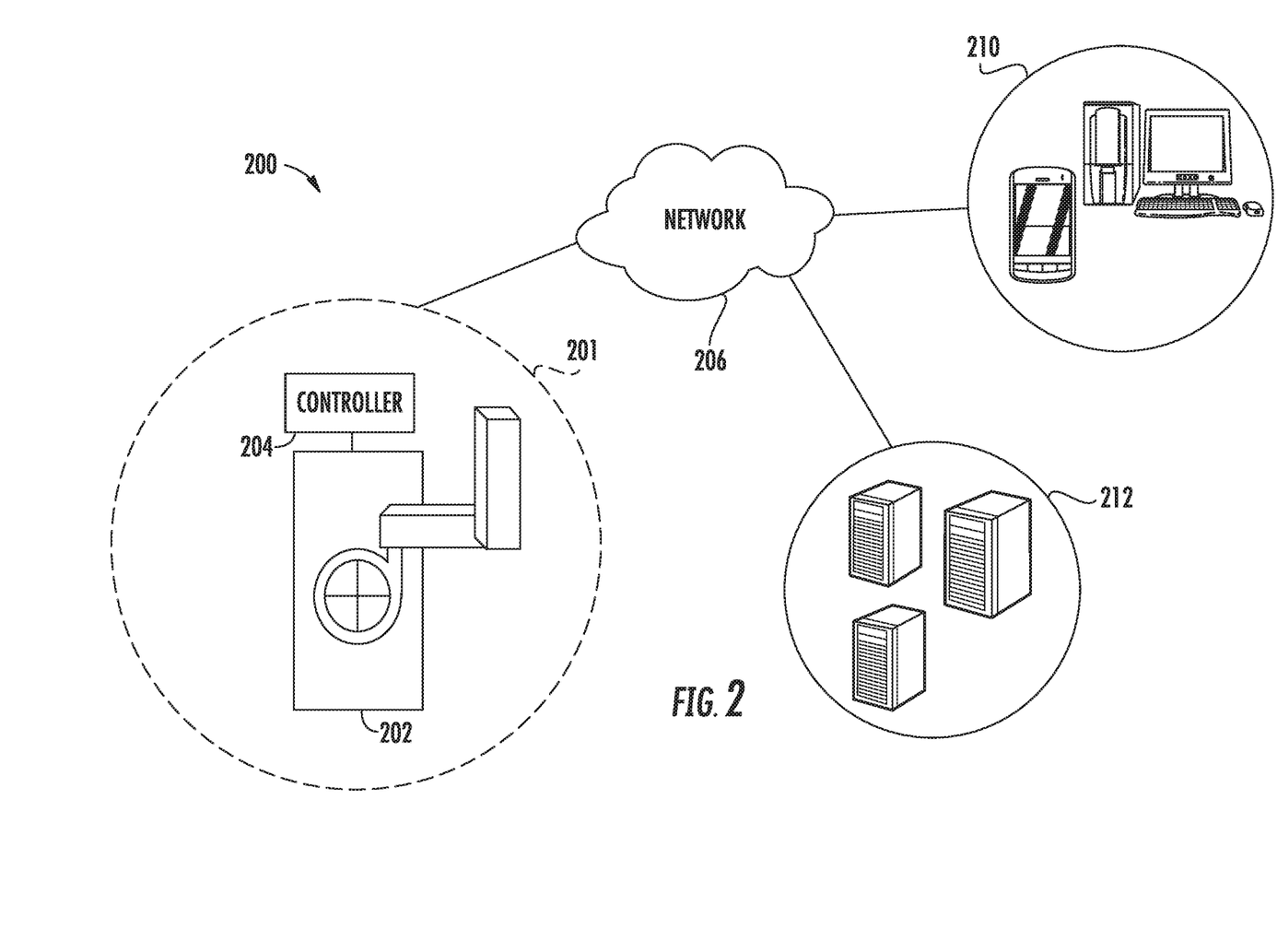
FIG. 2 illustrates a network capable of supporting a self-adaptive smart setback HVAC control system in accordance with one or more non-limiting embodiments.

Turning now to FIG. 2, a block diagram illustrates an HVAC control network 200 in accordance with one or more non-limiting embodiments. The HVAC control network 200 is in signal communication with an HVAC system 201 that includes one or more HVAC units 202. Although a single HVAC unit 202 is illustrated, it should be appreciated that the HVAC system 201 can include additional HVAC units. For example, the HVAC unit 202 may be included in a group of HVAC units. An HVAC group may include additional HVAC units (not shown) located at different areas of a building or house.

The HVAC unit 202 is in signal communication with one or more electronic controllers 204. The controller 204 includes a digital thermostat, for example, configured to control operation of the HVAC unit 202. Although one controller 204 is illustrated, it should be appreciated that multiple controllers can be located remotely from one another. Each controller 204 can control the HVAC unit 202.

The controller 204 can perform various functions including, but not limited to, switching on and off the HVAC unit 202, selecting a mode (e.g., heating mode, cooling mode, etc.) of the HVAC unit 202, setting a desired room temperature at which to operate the HVAC unit 202, and setting and storing operating schedules at which to operate the HVAC unit 202. The controller 204 also includes a memory capable of storing temperature set points, operating schedules and historical data such as for example, historical run-time data and historical temperature recovery data. The controller 204 is in signal communication with one or more sensors configured to detect and monitor various conditions such as, for example, room temperatures and humidity. In this manner, the controller 204 can actively control the HVAC unit 202 to achieve and/or maintain a room temperature set point value and/or set according to an operating schedule.

One or more of the controllers 204 may be in signal communication with a network 206. In some embodiments, the network 206 may include a data network, a computer network, a telephone network, a cloud network, etc. The network 206 may be in signal communication with one or more electronic user terminal devices 210, such as a desktop computer, a laptop computer, a mobile device (e.g., a cell phone, smartphone, smart wearable device), etc. In some embodiments, the controller 204 may communicate with a user device 210 via the network 206. In some embodiments, the controller 204 may communicate directly with a user device 210. For instance, the controller 204 may be capable of communicating directly with the user device 210 via a short-range communication protocol such as, for example, Bluetooth.

The HVAC control network 200 may be utilized to set and store an operating schedule for operating the HVAC unit 202. For example, a user may indicate, via the controller 204 and/or the electronic user terminal device 210, that they are going to be arriving at their house at a particular time. Such an indication may be provided in connection with a calendar associated with the user or the user device 210. Alternatively, the user's arrival at the house may be inferred or deduced based on the user's occupancy history stored in the controller 204. For example, global positioning system (GPS) or other location techniques may be used to obtain the user's location and time stamp. The data can be delivered from a user device 210 to the controller 204, via the network 206, such that the user's occupancy duration in the house can be determined on a daily basis. Based on the occupancy data, the controller 204 can determine (i.e., learn) the times the user enters, stays, and leaves the house. In this manner, the controller 204 can automatically control the HVAC unit 202 based on the learned occupancy data.

Figure 3A:
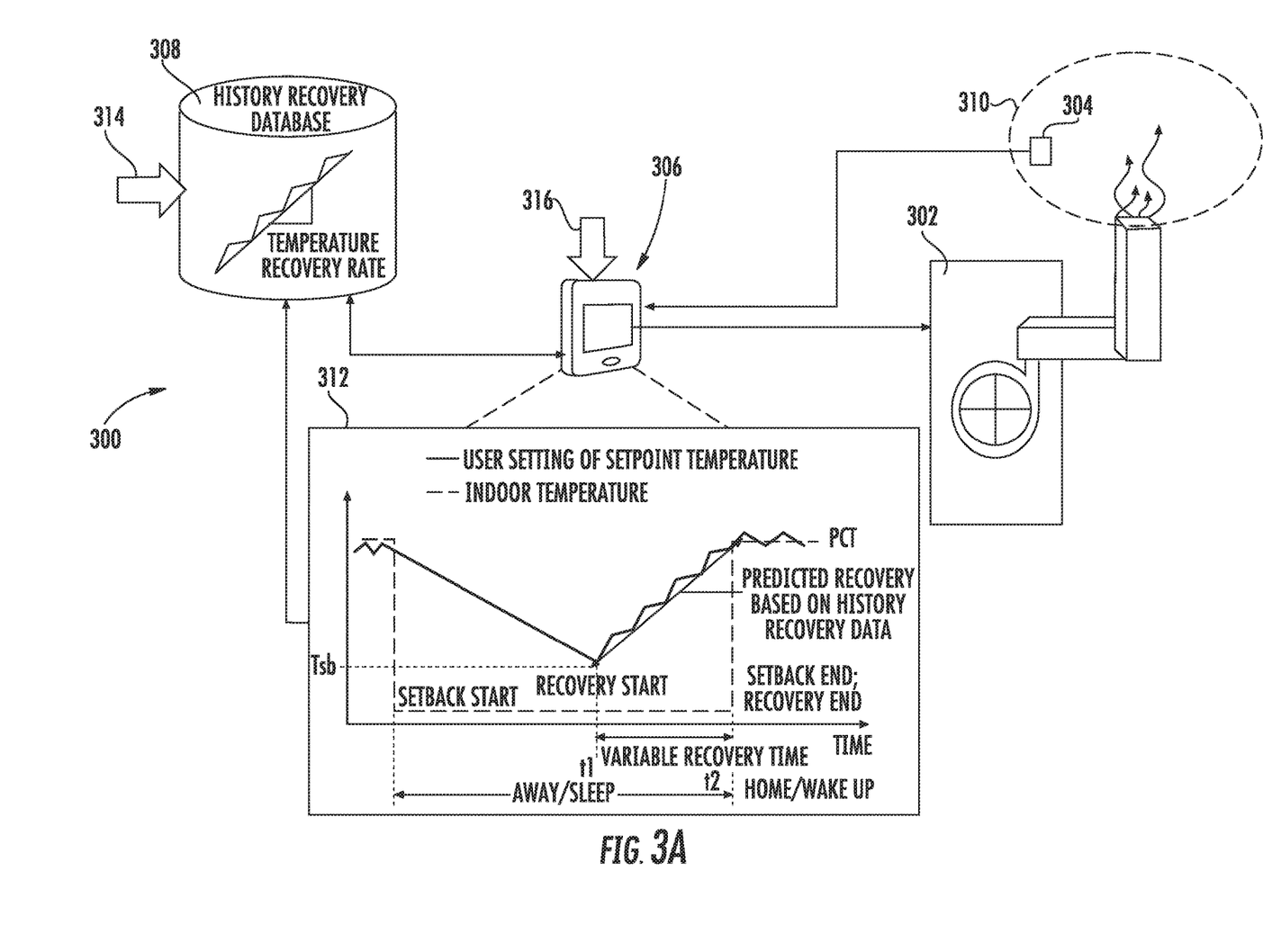
FIG. 3A is a block diagram of a self-adaptive smart setback HVAC control system according to a non-limiting embodiment.
Figure 3B:
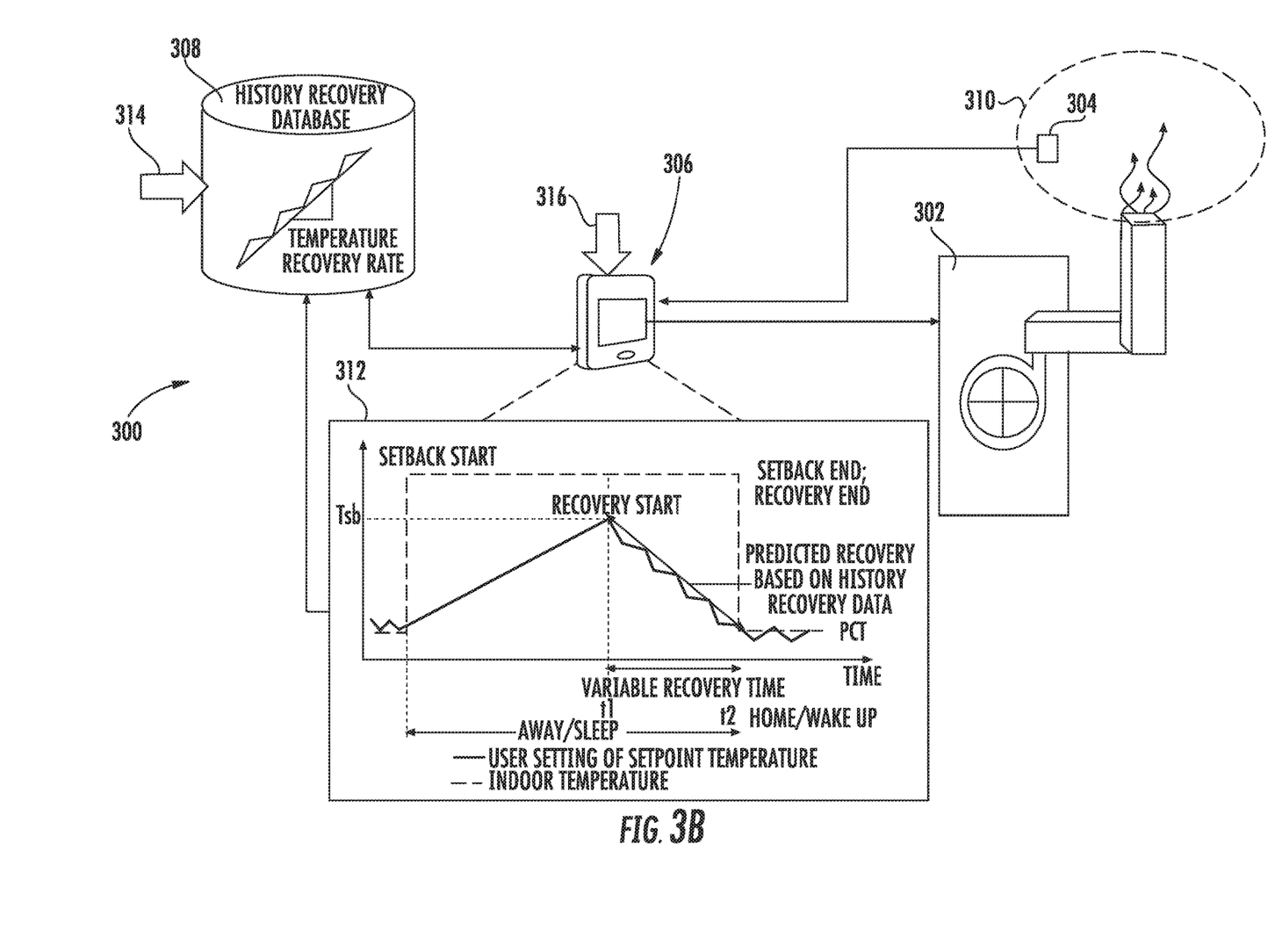
FIG. 3B is a block diagram of a self-adaptive smart setback HVAC control system according to a non-limiting embodiment

Turning now to FIGS. 3A-3B, a self-adaptive smart setback HVAC control system 300 is illustrated according to a non-limiting embodiment. The self-adaptive smart setback HVAC control system 300 includes an HVAC unit 302, one or more temperature sensors 304, an HVAC controller 306, and a database 308. The HVAC unit 302 is configured to deliver at least one of heated air and cooled air to a target area 310. The temperature sensor 304 is configured to determine an actual temperature of the target area 310.

The HVAC controller 306 is in signal communication with the HVAC unit 302, the temperature sensor 304, and the database 308. The HVAC controller 306 is configured to determine a temperature set-point value, and to operate the HVAC unit 302 based on a comparison between the actual temperature indicated by the temperature sensor 304 and the temperature set-point value. The HVAC controller 306 is also capable of operating the HVAC unit 302 according to an operating schedule. The operating schedule includes a temperature set point value, a start-time for starting operation of the HVAC unit 302, and a stop-time for discontinuing operation of the HVAC unit 302.

In at least one non-limiting, the HVAC controller 306 can selectively operate in an active mode and a setback mode. An occupant can schedule the active mode to operate during times when the occupant occupies a house or a particular room(s) of the house, and can schedule the setback mode to operate during times when the occupant is away from the house or during low-activity times of the day such as during time periods when the occupant is asleep. Accordingly, the active mode controls the HVAC unit 302 based on a first temperature setpoint value, while the setback mode that controls the HVAC unit based 302 on a second temperature setpoint value different from the first temperature setpoint value (i.e., according to lower temperature setpoint or higher temperature setpoint based on whether the HVAC system is operating in a heating mode or a cooing mode).

The database 308 stores various temperature setpoints, and operation schedules. The database 308 also stores a history of temperature recovery rates (i.e., one or more previously recorded temperature recovery rates) corresponding to the target area 310. A given temperature recovery rate is a rate at which the actual temperature is changed over a recovery time period to reach a temperature setpoint set according to the setback mode. The recovery time period is initiated following a setback time period. The recovery time period refers to the duration of time from which the recovery process begins and the recovery process ends. The setback time period is the time period that begins after initiating the setback mode.

The temperature setpoint value that is set by the user according to the setback mode is referred to as a post-setback comfort temperature (PCT) setpoint value because it indicates the target temperature at which the occupant desires to realize after the setback mode is completed. When the HVAC system operates in a heating mode, the recovery time period includes a first point in time (t1) at which the actual internal air temperature, "IAT" (i.e., measured by sensor 304) exists at a cooled temperature value (Tsb) after invoking the setback mode, and a second point in time (t2) at which the actual internal air temperature is increased to reach the PCT setpoint value (see FIG. 3A). When the HVAC system operates in a cooling mode, the recovery time period includes a first point in time (t1) at which the actual IAT exists at a warmer temperature value (Tsb) after invoking the setback mode, and a second point in time (t2) at which the actual internal air temperature is decreased to reach the PCT setpoint value (see FIG. 3B).

In at least one non-limiting embodiment, the HVAC controller 306 includes an electronic temperature setback unit 312, which can be constructed as an individual hardware controller including a processor and memory. When the setback mode is invoked, the temperature setback unit 312 is configured to determine the PCT setpoint, and to actively determine a temperature recovery start time. The temperature recovery start time initiates the HVAC unit 302 to generate cooled air or heated air such that the actual IAT of the target area 310 existing during the setback mode is changed to reach the PCT setpoint. In at least one non-limiting embodiment, the temperature setback unit 312 actively determines the recovery start time based on an upcoming temperature recovery rate and temperature difference between the actual IAT and the PCT setpoint.

The temperature setback unit 312 is capable of recording previously recovery data, learning a temperature recovery rate, calculating an upcoming recovery rate based on the learned data and current conditions, and determining an HVAC startup time based on the calculated upcoming recovery rate and current system conditions. The current system conditions include, but are not limited to, IAT, PCT, and OAT.

In one or more non-limiting embodiments, the upcoming recovery rate to be utilized during the invoked setback mode is determined based on a comparison between the previously recorded temperature recovery rates stored in the database 308 and current conditions of the target area 310. The current target area conditions include, but are not limited to, a current IAT measured by the sensor 304, a current outside air temperature (OAT) 314, and a HVAC capacity 316 of the HVAC unit 302. The OAT 314 can be provided to the HVAC controller 306 using temperature sensors installed outside of the house and/or can be obtained via a wireless connection (e.g., from the Internet).

In at least one embodiment, the temperature setback unit 312 determines the previously recorded temperature recovery rates by calculating an average among some of the previously recorded temperature recovery rates. For example, the temperature setback unit 312 can compare the current conditions of the target area 310 to the previously recorded temperature recovery rates stored in the database 308. The temperature setback unit 312 can then extract a portion of the previously recorded temperature recovery rates having conditions that substantially match the current conditions of the target area 310, and calculate an average of the extracted temperature recovery rates. In this manner, a more precise recovery rate is obtained with respect to the current target area conditions.

The temperature setback unit 312 can utilize the recovery setpoint time to determine a precise time at which to invoke the temperature recovery process such that the occupant realizes the desired PCT at the time the setback mode is completed. For example, the temperature setback unit 312 compares a current time while operating in the setback mode to the recovery start time. When the current time is equal to or greater than the recovery start time, the temperature setback unit 312 outputs a control signal that initiates the HVAC unit 302 to generate the cooled air or the heated air. The temperature setback unit then discontinues the setback mode in response to the IAT of the target area 310 reaching the PCT setpoint following the recovery start time.

Figure 4:
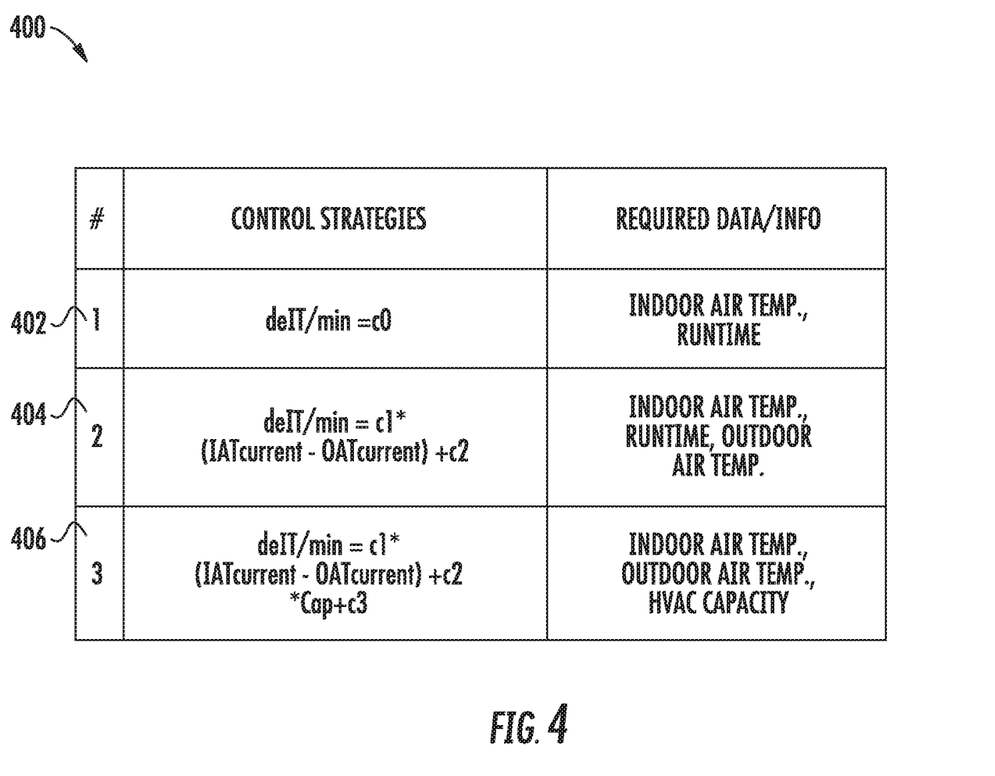
FIG. 4 is a table listing various control strategies for controlling a self-adaptive smart setback HVAC control system according to a non-limiting embodiment.

Referring to FIG. 4, a table listing various control strategies for controlling a self-adaptive smart setback HVAC control system is illustrated according to a non-limiting embodiment. A first control strategy 402 estimates an upcoming recovery rate (C0) by first storing previous temperature recovery rates (delT/min) in a database 308. The temperature recovery rate can be determined as a derivative of indoor temperature versus time. The temperature setback unit 312 then determines the upcoming recovery rate (C0) based on an average of each previously recorded temperature recovery rates.

According to a second control strategy 404, the temperature setback unit 312 actively monitors and stores (i.e., learns) the upcoming recovery rate (delT/min) based on changing thermal load characteristics of the target area 310. In at least one embodiment, the thermal load characteristics are based on a temperature differential (c1) between the current IAT of the targeted area 310 and the current OAT 314. The temperature differential (c1) can be determined using a least squares regression method.

According to a third control strategy 406, the temperature setback unit 312 actively monitors and stores (i.e., learns) the upcoming recovery rate (delT/min) based on changing thermal load characteristics of the target area 310 along with injected air capacity (Cap), and alternative loads (c3) such as solar temperatures. In at least one embodiment, the thermal load characteristics are based on a temperature differential (c1) between the current IAT of the targeted area 310 and the current OAT 314, along with an injected air capacity (c2) output to the target area 310. The temperature differential and injected air capacity can be determined using a least squares regression method.

Figure 5:
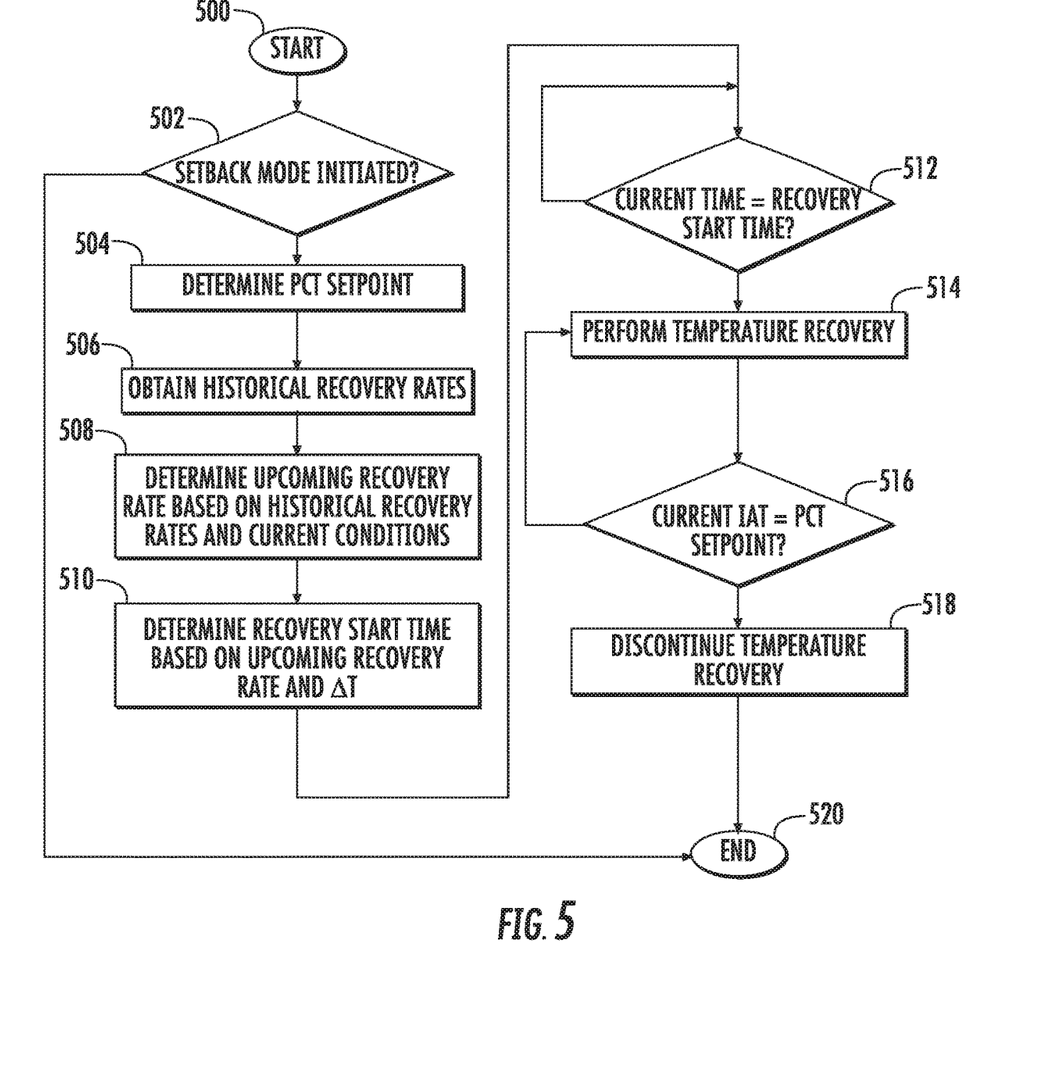
FIG. 5 is flow diagram illustrating a method of operating a self-adapting smart setback HVAC control system according to a non-limiting embodiment.

Turning now to FIG. 5, a flow diagram illustrates a method of operating a self-adapting smart setback HVAC control system according to a non-limiting embodiment. The method begins at operation 500, and at operation 502 a determination is made as to whether a setback mode of the HVAC system is initiated. If the setback is not initiated, the method ends at operation 502. When, however, the setback mode is initiated, a post-setback comfort temperature (PCT) setpoint value for a target area (e.g., a house or a specified room(s)) is determined at operation 504. At operation 506 one or more historical recovery rates are obtained. The historical recovery rates include one or more previously recorded temperature recovery rates corresponding to the target area. At operation 508, an upcoming recovery rate for the initiated setback mode is determined. The upcoming recovery rate is based on the historical recovery rates (e.g., an average of the recovery rates) and current target area conditions. The current target area conditions include, but are not limited to, a current IAT, a current OAT, and a HVAC capacity. At operation 510, a temperature recovery start time is determined. The temperature recovery start time refers to a point in time at which to initiate the HVAC unit and generate heated or cooled air such that the current IAC is changed to meet the PCT setpoint. In at least one non-limiting embodiment, the temperature recovery start time is based on the upcoming recovery rate a temperature differential ($\Delta T$) between the current IAC and the PCT setpoint. Accordingly, the temperature recovery start time may indicate that the temperature recovery process should be initiated at 6:00 AM in order to reach the PCT setpoint before the setback mode is scheduled to end at 7:00 AM.

Turning to operation 512, a determination is made as to whether a current time meets or exceeds the recovery start time (e.g., 6:00 AM). When the current time is earlier than the recovery start time, the method returns to operation 512 and continues monitoring the current time. When, however, the current time equals or is later than the recovery start time, the temperature recovery process is initiated at operation 514. Accordingly, the HVAC unit is initiated to generate heated air or cooled so that the current IAT can be changed to meet the PCT setpoint. At operation 516, a determination is made as to whether the IAT has reached the PCT setpoint. When the IAT is below the PCT setpoint, the method returns to operation 514, and the temperature recovery process continues. When, however, the IAT reaches the PCT setpoint, the temperature recovery process is discontinued (e.g., shuts off, or temporality stops the HVAC unit) at operation 518, and the method ends at operation 502.

Thus, as described above, a controller 204 (or other computing device or entity) may leverage occupancy data to actively control the HVAC unit 202. Such scheduling may be further enhanced if exterior environmental data and/or energy cost data is obtained, e.g., from the network 206. For example, the controller 204 is in signal communication with the network 206 and can obtain weather trends and weather forecasts stored on various servers 212. In this manner, the controller 204 can automatically adjust the settings of the HVAC unit 202 to take into account weather conditions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A self-adaptive smart setback heating, ventilation and air conditioning (HVAC) control system comprising:
    an HVAC unit configured to deliver at least one of heated air and cooled air to a target area;
    a temperature sensor configured to determine a current internal air temperature (IAT) of the target area;
    an HVAC controller in signal communication with the HVAC unit and the temperature sensor, the HVAC controller configured to selectively operate in an active mode and a setback mode, the active mode controlling the HVAC unit based on a first temperature setpoint value, and the setback mode controlling the HVAC unit based on a second temperature setpoint value different from the first temperature setpoint value,
    wherein the HVAC controller includes an electronic temperature setback unit that is configured change the IAT during the setback mode based on an actively determined upcoming temperature recovery rate, the actively determined upcoming temperature recovery rate is determined based on differential between a current IAT of the targeted area and a current outside air temperature (OAT), along with an injected air capacity output to the target area and wherein the actively determined upcoming temperature recovery rate is further based on an average of extracted portions of previously recorded temperature recovery rates having conditions that match current conditions of the target area,
    wherein the temperature setback unit is configured to determine a post-setback comfort temperature (PCT) setpoint that is different from the second temperature setpoint value, and to actively determine a recovery start time while operating in the setback mode based on the upcoming temperature recovery rate and temperature difference between the current IAT and the PCT setpoint, the recovery start time initiating the HVAC unit to generate the cooled air or the heated air such that the IAT of the target area existing during the setback mode is changed to reach the PCT setpoint at the upcoming temperature recovery rate.

2. The system of claim 1, wherein the upcoming temperature recovery rate is a rate at which the current temperature is changed over a recovery time period to reach the PCT setpoint.

3. The system of claim 2, further comprising a database configured to store at least one previously recorded temperature recovery rates corresponding to the target area.

4. The system of claim 3, wherein the upcoming recovery rate is determined based on a comparison between the previously recorded temperature recovery rates and current conditions of the target area.

5. The system of claim 4 wherein the electronic temperature setback unit determines the previously recorded temperature recovery rates based on performing operations of:
    recording a previous temperature recovery rate of the target area in response to changing the TAT during a previous setback mode;
    actively determining a learned temperature recovery rate of the target area based on a plurality of previously recorded temperature recovery rates;
    determining the current conditions of the target area;
    determining an upcoming temperature recovery rate of the target corresponding to an upcoming scheduled setback mode based on the learned temperature recovery rate and the current conditions; and determining the recovery start time based on the upcoming temperature recovery rate and the current conditions.

6. The system of claim 4, wherein the electronic temperature setback unit compares a current time while operating in the setback mode to the recovery start time, and initiates the HVAC unit to generate the cooled air or the heated air when the current time is equal to or later than the recovery start time.

7. The system of claim 6, wherein the electronic temperature setback unit discontinues the setback mode in response to the current IAT reaching the PCT setpoint following the recovery start time.

8. A method of controlling a self-adaptive smart setback heating, ventilation and air conditioning (HVAC) control system comprising:
delivering at least one of heated air and cooled air to a target area;
determining a current internal air temperature (IAT) of the target area;
selectively operating an HVAC controller in an active mode and a setback mode, the active mode controlling the HVAC unit based on a first temperature setpoint value, and the setback mode controlling the HVAC unit based on a second temperature setpoint value different from the first temperature setpoint value; and
actively determining an upcoming temperature recovery rate based on a differential between a current IAT of the targeted area and a current outside air temperature (OAT), along with an injected air capacity output to the target area;
changing the IAT during the setback mode from a recovery start time to a setback mode end time based on the actively determined upcoming temperature recovery rate,
wherein the recovery start time is actively determined while operating in the setback mode based on the upcoming temperature recovery rate and temperature difference between the current IAT and the PCT setpoint such that the second temperature setpoint is reached prior to the setback mode end time, and
wherein the actively determined upcoming temperature recovery rate is further based on operations comprising:
storing a plurality of previously recorded temperature recovery rates;
determining current conditions of the target area;
extracting portions of the previously recorded temperature recovery rates having conditions that match the current conditions of the target area; and
averaging the extracted portions to determine the upcoming temperature recovery rate.

9. The method of claim 8, further comprising determining a post-setback comfort temperature (PCT) setpoint that is different from the second temperature setpoint value;
actively determining a recovery start time while operating in the setback mode, the recovery start time initiating the HVAC unit to generate the cooled air or the heated air; and
changing the TAT of the target area existing during the setback mode to reach the PCT setpoint at the upcoming temperature recovery rate.

10. The method of claim 9, wherein the upcoming temperature recovery rate is a rate at which the current temperature is changed over a recovery time period to reach the PCT setpoint.

11. The method of claim 10, storing at least one previously recorded temperature recovery rates corresponding to the target area.

12. The method of claim 11, further comprising actively determining the recovery start time based on the upcoming temperature recovery rate and temperature difference between the current TAT and the PCT setpoint.

13. The method of claim 11, further comprising determining the upcoming recovery rate based on a comparison between the previously recorded temperature recovery rates and current conditions of the target area.

14. The method of claim 13, wherein determining the previously recorded temperature recovery rates comprises:
recording a previous temperature recovery rate of the target area in response to changing the IAT during a previous setback mode;
actively determining a learned temperature recovery rate of the target area based on a plurality of previously recorded temperature recovery rates;
determining the current conditions of the target area;
determining an upcoming temperature recovery rate of the target corresponding to an upcoming scheduled setback mode based on the learned temperature recovery rate and the current conditions; and
actively determining the recovery start time based on the upcoming temperature recovery rate and the current conditions.

15. The method of claim 13, further comprising:
comparing a current time while operating in the setback mode to the recovery start time; and
initiating the HVAC unit to generate the cooled air or the heated air when the current time is equal to or later than the recovery start time.

16. The method of 15, further comprising discontinuing the setback mode in response to the current TAT reaching the PCT setpoint following the recovery start time.

* * * * *